United States Patent
Milek

[15] 3,660,746
[45] May 2, 1972

[54] STEPPING MOTOR DAMPING SYSTEM

[72] Inventor: Donald L. Milek, Seal Beach, Calif.
[73] Assignee: Ex-Cello-O Corporation, Detroit, Mich.
[22] Filed: June 9, 1970
[21] Appl. No.: 45,172

[52] U.S. Cl. ............................................318/696, 318/685
[51] Int. Cl. .......................................................H02k 37/00
[58] Field of Search ..................318/696, 685, 138, 254; 310/49

[56] References Cited

UNITED STATES PATENTS

| | | | |
|---|---|---|---|
| 3,465,225 | 9/1969 | O'Regan | 318/138 |
| 3,345,547 | 10/1967 | Dunne | 318/138 |
| 3,514,680 | 5/1970 | Williams | 318/138 |
| 3,466,520 | 9/1969 | Aylikci et al | 318/696 |
| 3,385,984 | 5/1968 | O'Regan | 318/138 |

Primary Examiner—G. R. Simmons
Attorney—Christie, Parker & Hale

[57] ABSTRACT

Method and apparatus for electronically damping a stepping motor to prevent the rotor from oscillating in advancing from position to position. The electronic damping includes digital circuits constructed and defined for advancing the rotor from position to position and while advancing, energizing all of the stator windings for a time interval less than the time period required to advance the rotor from position to position and yet of sufficient time duration to prevent the rotor from hunting when it arrives at its new position.

11 Claims, 4 Drawing Figures

FIG. 2

A STEPPING MOTOR DAMPING SYSTEM

This invention relates to a method and apparatus for controlling a stepping motor and more particularly to a method and apparatus for electronically dampening a stepping motor.

At the present time the means for linearly advancing a machine element, record member, or the like has taken many forms. One mode of advancing a record member such as a paper tape is by continuously driving the tape through the use of a pinch roller and capstan arrangement. In this type of drive, the capstan is usually precisely controlled in order to drive the record member or tape at a constant linear speed to provide faithful reproduction of the information stored on the record member. Accordingly, the use of such a capstan drive is considered relatively expensive. The capstan drive has also been employed for incrementally advancing a record member. A less expensive arrangement for linearly driving a machine element or record member is through the use of a stepping motor. The stepping motor is energized at preselected intervals to cause the motor rotor to step or incrementally advance a preselected increment. The selected increment of rotation of the motor rotor is related to the desired incremental advancement of the driven element. When employing a stepping motor, however, it is necessary to provide some means for dampening the oscillations or hunting of the motor rotor that results from actuating or stepping the rotor. When the rotor arrives at its new position in response to the energization of a stator winding it will produce an oscillation of decreasing intensity with time. This undesirable action will be transmitted to the driven member that is coupled to the motor. Accordingly, some mechanical means of dampening the rotor has been conventionally employed with the stepping motor. There is also presently known an electronic means for dampening the stepping motor. The presently known electronic means for dampening the stepping motor consists of causing the rotor to be actuated in a direction opposite to the desired direction of travel towards its new position during the advancement of the rotor to its new position. This electronic means of dampening is known as retro-torque and has been found to have limited application. Accordingly, at the present time the applications for a stepping motor may be greatly expanded if some economical arrangement can be provided for electronically dampening the stepping motor, without mechanical dampening.

The present invention provides an improved method and apparatus for electronically dampening a stepping motor that allows the motor to be operated at its maximum response time and which is more reliable than present day capstan drive arrangements let alone other stepping motors. The method and apparatus for electronically dampening a stepping motor as provided by this invention is less expensive than other known electronic dampening means and less expensive to embody in present day equipment than the capstan drive.

The method of the present invention is directed to the controlling of a stepping motor including a rotor and a stator having a plurality of energizable windings spaced around the rotor for incrementally rotating or stepping the rotor in response to the energization of the individual stator windings. The method includes the steps of sequentially energizing the individual stator windings to cause the rotor to advance by magnetically snapping into alignment with the energized individual winding and thereby incrementally rotating the rotor. The rotor will advance in a direction controlled by the sequential energization of the stator windings. During the interval an individual winding is energized, momentarily energizing all of the windings of the stator for a time interval sufficient to prevent the rotor from producing oscillations upon arriving at its desired position. The selected individual stator winding is energized before the momentary energization of the remaining windings of the stator and maintained in energization for a preselected time interval thereafter to cause the rotor to incrementally advance in the desired direction.

The control apparatus for implementing the method of the present invention includes a source of control signals for providing output signals occurring at a rate related to the desired rate of advancement of a driven element, the driven element is coupled to be driven by the stepping motor in response to counting means coupled to be responsive to the control signals from said source and providing output signals to the individual energizable windings of the stator for actuating or rotating the motor rotor in accordance therewith. In addition, winding control means coupled to be responsive to the control signals from the source of control signals is adapted to provide an output signal to all of the energizable winding means of the motor for an interval coincident with the energization of the individual windings for a time interval to effect the necessary dampening of the rotor in its advancement from position to position. The counting means may be a binary counter associated with a binary decoder for decoding the pattern of output signals from the counting means to cause an individual winding to be energized in accordance with the count and the plurality of windings to be sequentially energized in accordance with the count pattern provided by the counting means.

These and other features of the present invention may be more fully appreciated when considered in the light of the following specification and drawings, in which.

Before examining the implementation of the stepping motor, a brief description of the structure and operation of the stepping motor will facilitate the understanding of the invention. The stepping motor under consideration for the purpose of the present invention is of conventional construction and includes a rotor having a plurality of magnetic poles defined thereon and a stator having a corresponding plurality of energizable windings spaced around the rotor for defining stator poles when energized. The windings defined magnetic poles coacting with the poles of the rotor to cause the rotor to travel towards the stator pole and snap in alignment therewith. The stator windings are further arranged into groups of different phases for defining the stator poles so that the adjacent windings of each group define magnetic poles of opposite polarity and the windings of the same phase in each group are electrically connected together. Accordingly, with the energization of an individual winding of a group, all of the same windings in the other groups are energized and with the sequential energization of the winding of each group the stator poles are defined in advance of the pole on the rotor to cause the rotor pole to successively snap into alignment with the stator poles and thereby incrementally advance the rotor. In this conventional stepping motor, it is the actuation of the rotor to advance it to a new position that produces the hunting or oscillation that limits the application of the stepping motor. A more complete disclosure of the stepping motor structure is found in the publication "Control Engineering" for January 1958, page 85, and the references cited therein.

Figure 2:
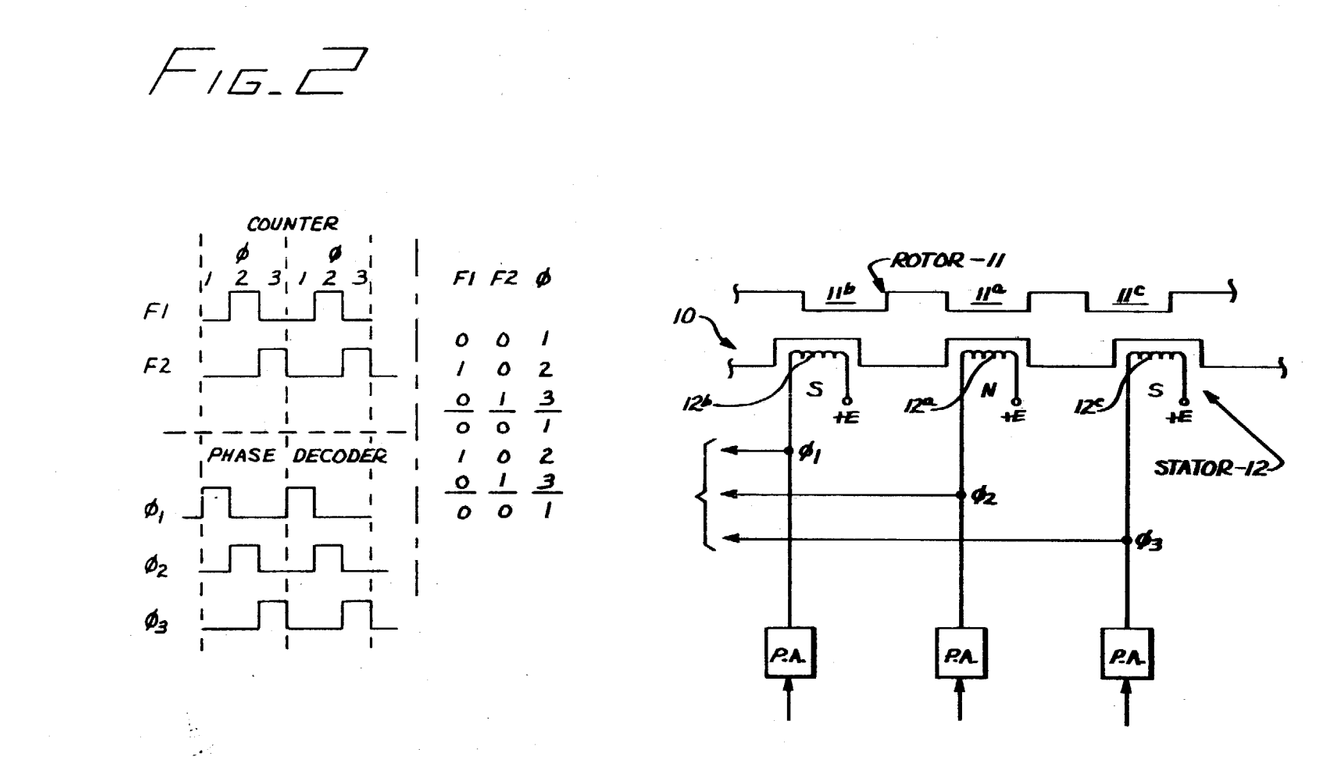
FIG. 2 is a partial, developed view of the stepping motor employed in FIG. 1 and illustrating the time relationship of the signals from the counting means and the phase decoder for energizing the stator windings of the stepping motor.

The present invention can be better appreciated if the method of controlling the stepping motor is first investigated. For this purpose, reference will be first made to FIG. 2 wherein a stepping motor 10 is diagrammatically represented. In FIG. 2 the rotor 11 and the stator 12 of the motor 10 are illustrated in partial, exploded form to better appreciate the relationship of the magnetic poles for the rotor and the stator. For this purpose it will be noted that the rotor poles are spaced opposite to the stator windings and that the one rotor pole, the pole identified as the pole 11A is spaced across from the corresponding stator winding 12A and in alignment with the stator pole. The rotor pole 11B, illustrated to the left of the rotor pole 11A, is shown out of alignment with its corresponding stator pole and in a position advanced to the right, or leading, with respect to the stator pole. In the same fashion, the rotor pole 11C arranged on the opposite side of the pole 11A is in a lagging relationship with respect to the corresponding stator pole. The poles 11B and 11C may be leading and lagging by approximately one-third of a toothwidth so that when a pole, such as the pole 11A, is magnetically snapped into alignment with the coacting energized stator pole, the adjacent rotor poles will overlap the stator teeth by the two-thirds toothwidth in accordance with the illustrated stepping motor structure.

The stator 12 is illustrated with individual windings 12B, 12A and 12C arranged from left to right and opposite the corresponding rotor poles 11B, 11A and 11C, as illustrated. One terminal of each winding is connected to a positive source of power, while the other terminal of each winding is illustrated connected to a power amplifier for continuously energizing one of the windings. The windings of the stator 12 are divided into groups of three and each winding 12A, 12B and 12C has a connection to a similar winding in the other groups defining the stator windings in accordance with the selected number of increments of rotation desired for the stepping motor. It will be assumed that the stepping motor 10 of the present invention can be incremented 15° with the energization of a stator winding. Accordingly for a complete revolution of the rotor 11, 24 steps or increments are required resulting in eight groups of three windings each. The method of the present invention includes sequentially energizing the windings 12B, 12A and 12C to cause the rotor to sequentially magnetically align itself with the energized stator winding defining a magnetic pole coacting therewith. For example, if the stator winding 12B is considered the phase 1 winding, the 12A winding as the phase 2 winding, and the 12C winding as the phase 3 winding, the action of the rotor 11 with the sequential energization of the three phases can be better examined. If the rotor pole 11A is positioned to the left of the stator winding 12B, and it is desired to step the rotor 11 into alignment with the phase 1 winding, it will be necessary to energize the winding 12B of the stator. At this time it should be noted that the magnetic poles defined on the opposite sides of an energized winding are of the opposite magnetic polarity from that defined by the energized winding. With the energization of the winding 12B the magnetic pole created by the energization of the winding will cause the rotor 11 to rotate so that the pole 11A aligns itself with the stator pole defined by the winding 12B. Accordingly, when the winding 12B is de-energized and the winding 12A is energized the rotor 11 will be advanced, once again, so that rotor pole 11A will align itself with the pole associated with the stator winding 12A. In the same fashion the pole 11A will be advanced opposite the phase 3 winding when the winding 12C is energized. The same action occurs within each of the groups of the stator windings so that the rotor is magnetically urged into rotation in accordance with the energization of the individual winding of the stator to produce the desired increments of rotation. It will, of course, be appreciated that the direction of the rotation of the rotor will be in accordance with the direction of sequential energization of the stator windings. For example, in the above illustration, the windings were energized from left to right causing the rotor 11 to rotate advance counter-clockwise. The energization of the stator windings in the reverse order will cause the rotor 11 to rotate clockwise.

In the aforementioned discussion of the snapping of the rotor into alignment with a corresponding stator pole it can be appreciated that there is a jittering or oscillation of the rotor as a result of the actuation of the rotor. Accordingly, any driven elements coupled to the rotor shaft will hunt in response thereto. To prevent such jittering action the method of the present invention includes the step of energizing the windings on the opposite side of the selected individual energized winding corresponding to the desired position of the rotor. As illustrated in FIG. 2, for example, if the winding 12A has been energized during this time, and the rotor tooth 11A is advancing towards the phase 2 winding, the windings 12B and 12C are momentarily energized. The windings 12B and 12C are energized along with the winding 12A for a time interval that has been determined to eliminate the jittering or oscillating of the rotor as it snaps into alignment with the energized stator pole. In a specific embodiment, the adjacent windings 12B and 12C are energized at a time when the rotor pole 11A is approximately one-fourth of the distance to its final position in alignment with the stator pole for phase 2. At this time the winding 12B and 12C are energized and it is though that this energization eliminates the usual oscillation associated with the rotor assuming a new position. As a consequence of this electronic dampening action, it has been found that the response time of the stepping motor 10 will be increased so that there is practically no overshoot when stepping the rotor from position to position.

Now referring to FIG. 1, the system for implementing the method described hereinabove can be examined. The system illustrated in FIG. 1 embodies the invention as it may be employed for the purposes of incrementally linearly advancing a record member 20. For this purpose, a record member is illustrated in the form of a paper tape having a plurality of longitudinally aligned, spaced apart feed holes 20A recorded thereon. The record member 20 is arranged with a light source 21 on one side thereof for illuminating the record member 20 and a photo-sensor 22 arranged on the opposite side of the record member and providing an electrical or the feed hole signal, FH, in response to the sensing of the feed holes 20A. The feed hole signals, then, will be employed as control signals for the circuit means that control the stepping motor 10. The record member 20 is linearly and incrementally advanced by means of the stepping motor 10. For this purpose, the stepping motor 10 will be provided with a sprocket wheel 23 coupled thereto to be rotatable with the motor rotor and with the sprocket teeth 23A in engagement with the feed holes 20A of the record member 20. It should be appreciated, then, with each increment of rotation of the rotor shaft, the sprocket wheel 23 will rotate in unison therewith and thereby linearly advance the record member 20 in response to the rotation of the sprocket wheel 23. With the particular motor 10 under consideration, an increment of 15° is equivalent to one-tenth of an inch linear advancement of the tape 20.

The energization of the stator windings of the stepping motor 10 is produced through the provision of a bi-directional counter 24. The control system is constructed and defined so that the bi-directional counter 24 is responsive to the clock pulses provided by the clock pulse generator 25. The direction of the count for the counter 24 is controlled by a direction command signal from the source of direction commands 26. The direction command signal controls the counter 24 so that it either counts up or counts down in accordance with the desired direction of travel of the record member 20, i.e., to the right or to the left. The bi-directional counter 24 produces a count pattern in response to each clock pulse coupled thereto and the pattern of the counter 24 is decoded by means of a phase decoder 27 coupled to receive the output pattern of signals from the counter 24 and provide a signal for energizing an individual winding of the stator 12 for the stepping motor 10. The decoded signals from the phase detector 27 are coupled to the stepping motor 10 by means of an OR gate 28.

The clock pulse generator 25 comprises an OR gate 29 for receiving the signals from the source of direction commands 26 and provides an output signal to an AND gate 30. The AND gate 30 is also connected to be responsive to the feed hole signal through the advancing or step rate circuit 31 and an OR gate 32 coupled to the output of the circuit 31. The output of the AND gate 30 is coupled to trigger a pulse generator 33 which provides clock pulses at a rate related to the desired rate of travel of the record member 20. The clock pulses are derived from the terminal identified as the CP terminal and which terminal has a lead wire coupled to the counter 24.

The arrangement of eliminating the jittering action of the rotor 11 by producing the momentary energization of all of the stator windings is produced by the anti-jitter control element identified by reference number 34. The anti-jitter control 34 is responsive to a clock pulse from the generator 25 and provides an output signal to the OR gate 28 for actuating all of the windings of the stator 12 of the stepping motor 10.

The advancing or step rate circuit 31 is illustrated as including a pulse generator 31A coupled to be responsive to the feed hole signal FH. The pulse generator 31A is controllable to provide pulses to the OR gate 32 at a rate for controlling the rate of advancement of the record member 20. In particular, the advancing or step rate circuit element 31 may be employed for controlling the rate of travel of the record member 20 during the time that the information recorded on the record member 20 is being read or sensed. For the rewinding operation, when no information is being sensed, it is desired to quickly return the record tape 20 to the left-hand spool at the completion of a reading operation, during which time the tape was advanced from left to right. To this end, a circuit element 35, identified as the fast rewind element, is coupled to be responsive to the feed hole signal. This element 35 bypasses the step-rate circuit 31 and triggers the clock pulse generator 25 to operate at a high repetition rate for rapidly advancing the record member 20. The rewind or reading speeds may be selected by means of a mode selection switch, diagrammatically illustrated as a switch 36 connected to the outputs of the step-rate circuit 31 and the fast rewind circuit 35.

Figure 1:
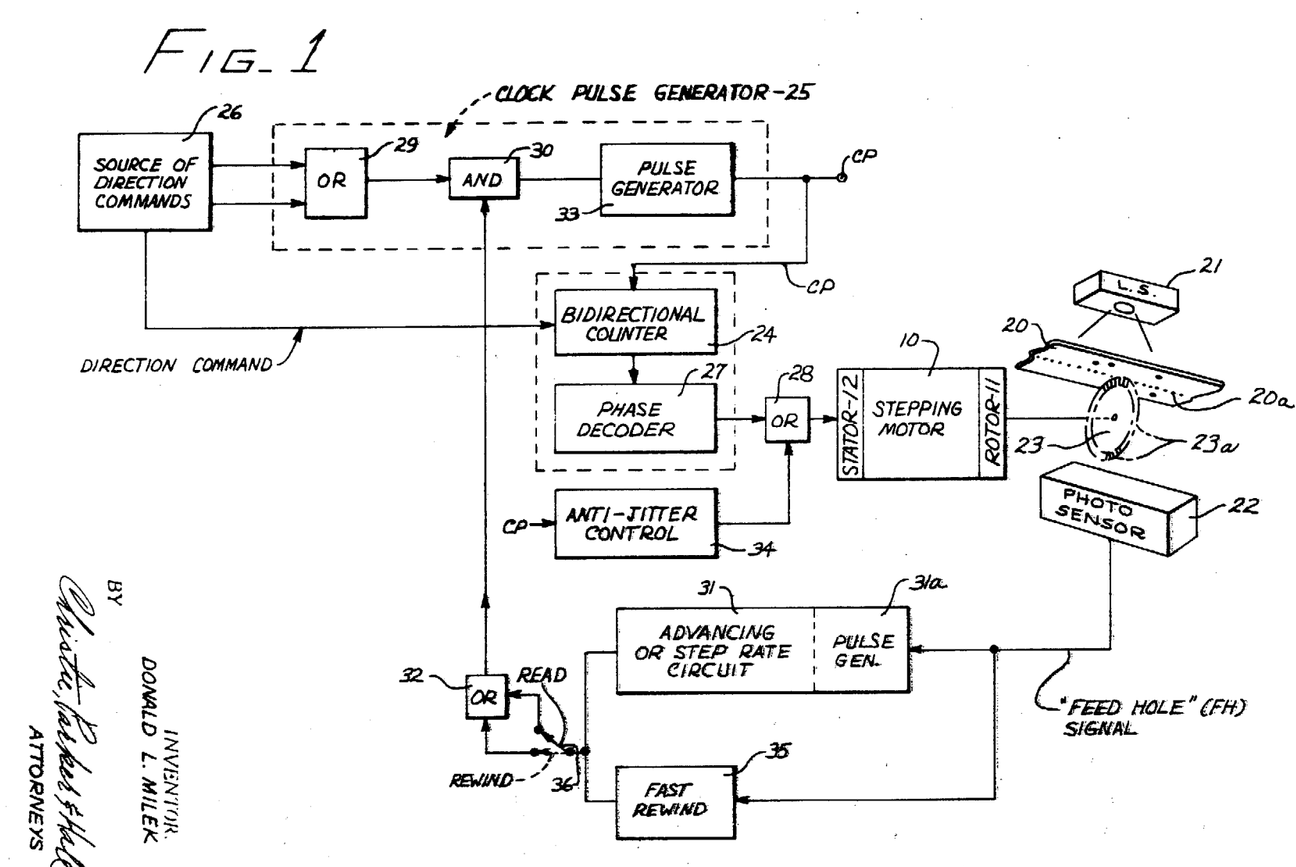
FIG. 1 is a block diagram of the control apparatus embodying the present invention.

With the above structure in mind, the operation of the structure of FIG. 1 can now be examined in detail. It will be assumed that it is desired to advance the record member 20 from left to right for reading or sensing the tape 20 and accordingly the switch 36 is placed in the read mode and the source of direction commands 26 is actuated so that the direction command signal coupled to the bi-directional counter 24 controls it to count up. It will also be assumed in accordance with the representations of FIG. 2, that the capacity of the counter 24 is three counts so that each of the phases for a group of windings for the stator 12 will be sequentially energized in accordance with the count of the counter 24. The counter 24 will be considered to initially read 00. In this condition, the winding 12B or the phase 1 winding will be energized. At this time, the rotor 11 will be aligned with the phase 1 winding of the stator 12 and the pole defined by the energization of the winding 12B to incrementally advance the record member 20. With the application of the command signal to the circuit a clock pulse will be generated for the advancement of the record member 20. This will count up the counter 24 and its output pattern will now signal 10. This pattern will be decoded by the decoder 27 and the resulting output signal will energize the winding 12A with the advancement of the record member 20, the next feed hole 20A will be sensed so that the sensor 22 will provide an output signal to the step-rate circuit 31, and in turn by means of the OR gate 32 and the AND gate 30 the pulse generator 33 is triggered. The clock pulse provided by the pulse generator 25 is coupled to the counter 24 to count up the counter so that its output pattern will now read 01. This will cause the phase decoder 27 to decode this pattern so that the signal derived from the OR gate 28 will energize the phase three winding or the winding 12C for the stator 12.

During each of the winding energization periods and a preselected interval after the generation of a clock pulse, a pulse will be derived from the anti-jitter element 34 in response to the clock pulse. This pulse will occur during the interval that the rotor is advancing between positions and will be effective for energizing windings 12A, 12B and 12C momentarily. Upon the termination of the signal from the anti-jitter control element 34, the winding 12A is maintained energized to allow the rotor 11 to position itself without jittering. With the advancement of the rotor 11A, the record member 20 is also advanced and so another feed hole signal is generated for counting up the counter 24. During this third phase the counter will read 0 1 and the phase 3 winding will be energized along with the subsequent energization of the anti-jitter control element 34. Following the advancement of the record member 20 the counter will be set to its initial state, reading 0 0 and the cycle will continue with each group of three phase windings being sequentially energized for advancing the tape 20 from left to right. It will be appreciated that with a "left" command coupled from the command source 26 the counter will be counted down to cause the rotor to rotate in the opposite direction to thereby advance the record member 20 from right to left.

Figure 3A:
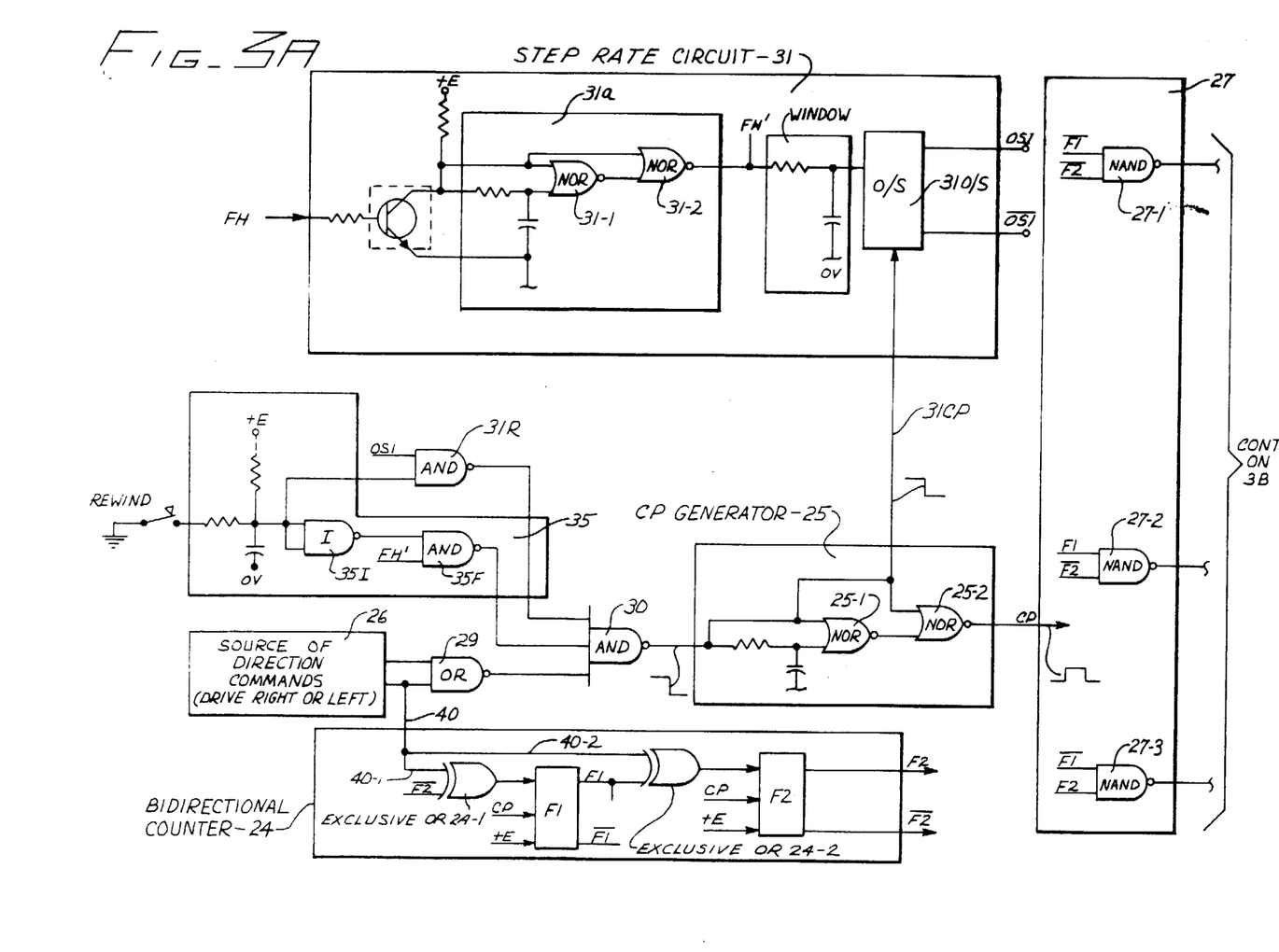
FIG. 3 is a schematic circuit diagram of the control apparatus of FIG. 1.
Figure 3B:
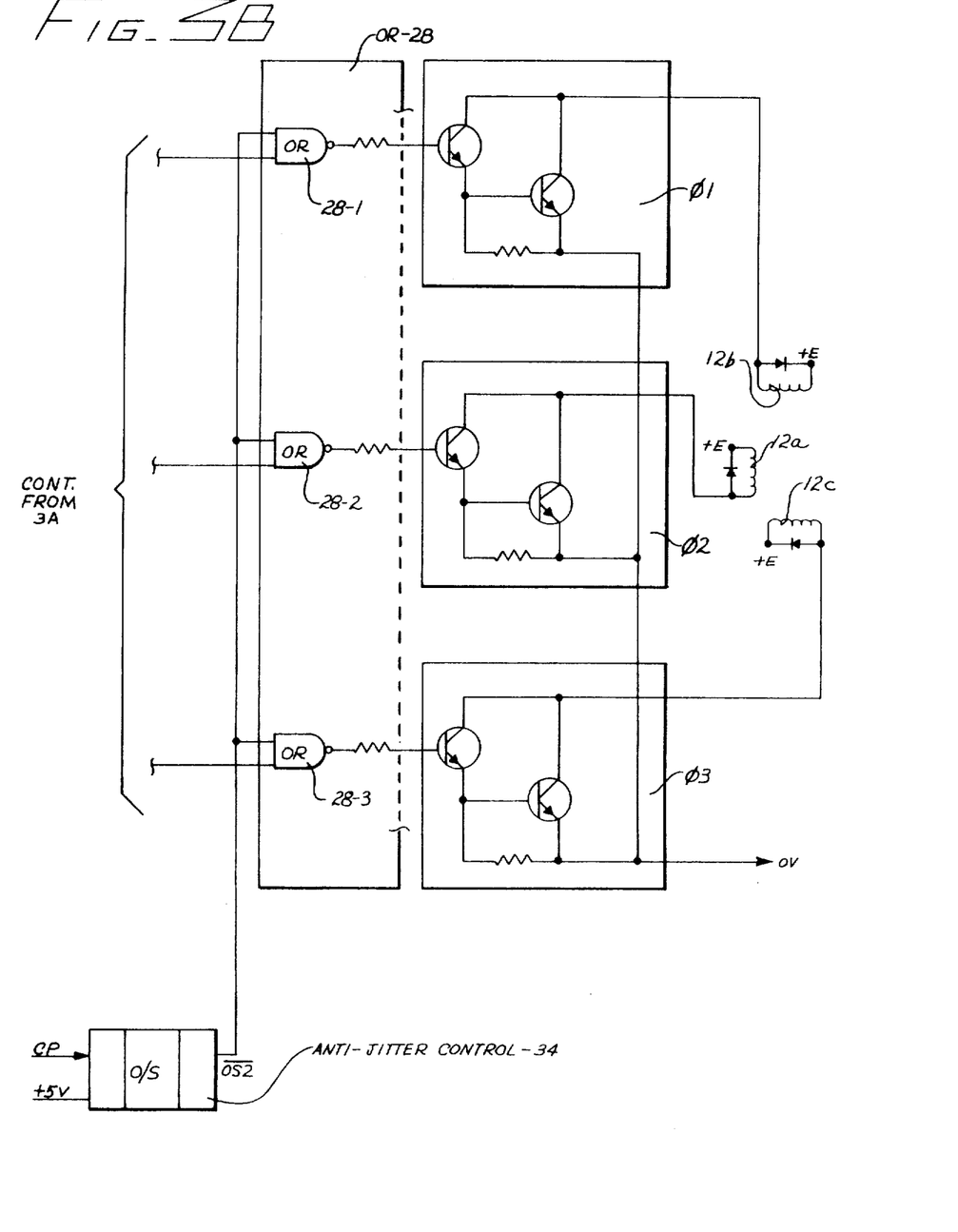

Now referring to FIG. 3, the detailed structural organization of the control apparatus of the present invention will be examined. The source of direction commands 26, illustrated in FIG. 3 in block form, commands the control circuitry to drive the record member 20 to the right or to the left in accordance with the direction of travel which the user desires, as in the previous embodiment. In the event that the invention is employed in a paper tape reader the drive to the right can be considered as the reading mode, and the drive to the left can be considered as the rewind mode. The signal derived from the command source 26 may be a pulse signal which would incrementally advance the record member 20, or the distance between the feed holes 20A. The record member 20 may be continuously driven whereby the feed hole signals will continuously function to incrementally advance the record member 20. The direction command is applied to the bi-directional counter 24 to control the direction of the count as signalled by the direction command appearing on the lead wire 40.

The bi-directional counter 24 is constructed and defined by two bistable elements which may be flip-flops and are identified as the elements F1 and F2. The "set" input for the elements F1 and F2 are arranged with an exclusive OR circuit 24-1 for the element F1 and an exclusive OR circuit 24-2 for the element F2. The bistable elements F1 and F2 can be considered to be J-K flip-flops so that the K input is always TRUE or is connected to a positive source of potential, as illustrated. The remaining inputs to the elements F1 and F2 are the clock pulse inputs identified as CP. The two complimentary outputs of the bistable elements F1 and F2 are identified in conventional fashion as the F1 and $\overline{F1}$ outputs for the F1 element, and F2 and $\overline{F2}$ for the F2 element. The direction command signal from the lead wire 40 is coupled to each of the exclusive OR circuits 24-1 and 24-2 as one input signal to each of these gating elements. The remaining input for the exclusive OR circuit 24-1 is the $\overline{F2}$ output signal from the element F2, while the remaining input to the exclusive OR circuit 24-2 is the $\overline{F1}$ output signal from the element F1. The count capacity of the counter 24 is defined to have a maximum capacity of three counts and the elements F1 and F2 are initially set to indicate a zero count and provide an output pattern of 00.

The signal from the source of direction commands 26 is also applied to an OR gate 29 which in turn has its output circuit connected to a three input AND circuit 30. In addition to the input from the OR circuit 29 the two inputs to the AND gate 30 comprise the signals for operating the control apparatus in either the "read" mode or the "fast rewind" mode in accordance with a selection of the mode by the user through the operation of mode selector switch 36. This structure will be described in detail immediately hereinafter. The output signal from the AND gate 30 is coupled to the clock pulse generator 25 that provides a clock pulse from its CP output terminal that has a repetition rate in accordance with the desired rate of linear travel for the record member 20. The clock pulse generator may be of any conventional construction and as illustrated in FIG. 3 comprises two serially arranged NOR gates 25-1 and 25-2. The NOR circuit 25-1 receives the output signal from the AND gate 30. The output of the NOR gate 25-1 is connected as an input to the NOR gate 25-2. The clock pulse driven from the CP terminal of the clock pulse generator 25 is coupled to each of the elements identified as having a corresponding CP input terminal such as the elements F1 and F2 of the bi-directional counter 24.

As will be appreciated by those skilled in the art, each count signalled by the counter 24 provides a different output pattern of signals as a result of the switching of the elements F1 and F2 of the counter 24. This pattern of signals is decoded by the decoding element 27 comprising three NAND gates 27-1, 27-2 and 27-3. The NAND gates 27-1, 27-2 and 27-3 are defined for providing an output signal to an individual stator winding of the stepping motor 10. In particular, the NAND circuits define an energizing signal for the respective phases 1, 2 and 3 of the windings identified by the reference letters 12A, 12B and 12C. For this purpose the phase decoder 27 is defined so that the NAND circuit 27-1 has as input signals the signals $\overline{F1}$ and $\overline{F2}$. When these input conditions are met then the phase 1 winding will be energized. The NAND circuit 27-2 has as its input signals for providing a winding energizing signal to the phase 2 windings, the signals F1 and $\overline{F2}$. The phase 3 windings are energized through the NAND circuit 27-3 when the signals $\overline{F1}$ and F2 occur at this gate. Each of the NAND circuits for the phase decoder 27 are coupled to an individual OR gate comprising the OR gate 28. For this purpose OR gate 28-1 is coupled to receive the signals from the NAND circuit 27-1, while the OR gate 28-2 receives the output signals from the NAND gate 27-2 and the signals from the gate 27-3 is coupled to OR circuit 28-3. The output for each of the individual circuits 28-1, 28-2 and 28-3 are connected to a power amplifying circuit that is responsive to the output signals from each of the OR gates for amplifying these signals and energizing the individual windings. The power amplifiers are shown as two stages of power transistor amplifiers connected to an individual stator winding. The power amplifiers are further identified as the phase 1, phase 2 and phase 3 power amplifiers in accordance with the windings that are to be energized therefrom. The power amplifiers are of conventional construction and need not be further considered for the purposes of this invention.

The step-rate circuit 31 is coupled to be responsive to the feed hole signal which is identified as the feed hole signal (FH) for providing the necessary pulse for triggering the clock pulse generator 25. The feed hole signal is coupled through a pulse generator by means of a transistor amplifier. The pulse generator is of the same general construction as the clock pulse generator 25 in that it is constructed of a pair of NOR gates 31-1 and 31-2 arranged in serial fashion for defining a pulse repetition rate in accordance with the rate for which the feed hole signals FH are received. For this purpose the feed hole signal is derived from the input amplifier as one input signal to the NOR gate 31-1. The other input signal being connected to a source of positive potential and in common with one of the input circuits for the NOR gate 31-2. The other input to the NOR gate 31-2 is coupled to the output circuit for the NOR gate 31-1. At this point it should be noted that the output circuit for the NOR circuit 31-2 further includes an output signal identified as FH'. This FH' signal is coupled to the input of the AND gate 35F and will be considered hereinafter. The output circuit from the NOR circuit 31-2 is connected through an RC circuit further identified as a "window". The provision of the "window" allows the user to advance the record member 20 from 0 to approximately 250 characters per second. For this purpose, if the input signal goes FALSE 50 microseconds after it went TRUE and less than 2 microseconds after the next feed hole is sensed, the one-shot multivibrator 31-0/S coupled to the RC circuit will not be triggered. This action occurs if the level of the signal on lead wire 31CP goes FALSE and thereby inhibits the triggering of the one-shot multivibrator 31-0/S in accordance with the aforementioned time limits. The one-shot multivibrator 31-0/S is adjustable and provides a variable continuous advance rate. One of the output terminals of the one-shot is identified as the OSI output, while the other output is identified as $\overline{OSI}$.

The fast rewind circuit 35 is defined to bypass the advancing or step-rate circuit 31 and apply the FH' signals directly to the clock pulse generator 25. The circuit 35 is defined to provide a clock pulse repetition rate of a higher rate than that provided from the circuit 31. For this purpose the mode selection switch 36 would be placed in the rewind mode. The fast rewind circuit 35 comprises an inverter 35I coupled to ground when the rewind position is selected by means of the mode selector switch. The inverter 35I has its output connected to an AND circuit 35F. The other input to the AND circuit 35F is the FH' signal derived from the step-rate circuit 31 and mentioned hereinabove. The output of the AND gate 35F is coupled as one input to the AND circuit 30. In the same fashion when the circuit is operating in the read mode, an AND circuit 31R is utilized and it has one input connected in common with the input signal to the inverter 35I. The remaining input to the AND circuit 31R is the OSI signal from the one-shot multivibrator of the step-rate circuit 31. The output of the AND circuit 31R is the remaining input to the three input AND gate 31.

The anti-jitter control circuit 34 comprises a one-shot element that is coupled to be responsive to the clock pulse provided from the generator 25. The output of the one-shot element 34 is identified as the $\overline{OS2}$ output. The one-shot element is defined to provide a preselected time delay in response to a clock pulse signal that allows the stator winding energized by the phase decoder 27 to be energized and after a preselected time later the OS2 signal is derived from the anti-jitter control circuit 34 and is coupled in common to each of the OR circuits 28-1 and 28-2 and 28-3. Accordingly, a pulse will appear at the output of each of these OR circuits for a preselected time interval that will cause all of the windings for each of the phases to be energized in addition to the energization of the selected winding to eliminate the conventional hunting problem.

With the above structure in mind and with specific reference to FIG. 3, the detailed operation of the control circuit for the stepping motor 10 will be examined. It will be assumed that the counter is in the 0 count and that the elements F1 and F2 read 00. The output pattern for the three counts of the counter and the corresponding wave forms derived from the counter and phase decoder are illustrated in FIG. 2. In particular, the counter 24 will signal the patterns 0 0, 1 0, and 0 1 for energizing the phases 1, 2 and 3 windings respectively in counting from 0 to 2. It will now be assumed that the direction command will be in the positive direction or for moving the tape right to left and that the tape is being advanced in the read mode. Under these conditions, the phase 1 winding, winding 12B, will be energized.

In order to step the rotor 11 to the next position the source of direction commands 26 will be activated. It will be recognized that the source of direction commands will be actuated either by means of a switch arranged on the front panel of the control apparatus that is operable by a user or the signals may be automatically provided with some associated control circuitry. With the initiation of the command signal the clock pulse generator 25 will be activated as a signal will be provided from the AND circuit 30. At this time, the input to the inverter 35I is not grounded and with the reception of the signal OSI from the step-rate circuit 31, the AND circuit 31R will have its input conditions satisfied and will provide a TRUE signal to the AND gate 30. The output signal from the AND gate 35F will be TRUE at this interval and will be coupled to the AND circuit 30. This, then, will provide a signal from the AND circuit 30 for generating a clock pulse. Thus clock pulse will count the counter 24 up one count so that the counter elements will signal 1 0. With this count prevailing the input signals to the NAND circuit 27-2 will be satisfied so that the OR gate 28-2 will activate the $\phi$2 power amplifier for energizing the winding 12A. This will cause the rotor 11 to begin its advance to the next position. During the interval that the rotor 11 is advancing, the clock pulse will also be coupled to the anti-jitter control element 34 so that a preselected interval after the energization of the winding 12A, a pulse will appear for a preselected interval at the OS2 output of the element 34. This signal will be coupled to each of the OR gates 28-1, 28-2 and 28-3 and thereby to all of the windings for the stator of the step motor 10 to momentarily energize them. Subsequently, with the deenergization of all of the windings except the phase 2 winding, or winding 12-A, the rotor 11 will continue to its new position and magnetically snap into alignment with the corresponding stator pole without any jitter. With the advancement of the tape to a new position the feed hole signal FH will be generated and is applied to the pulse generator 31A for triggering the element 31-0/S of the step-rate circuit 31. The signal 31CP will trigger the clock pulse generator 25 to provide the next clock pulse for counting up the counter 24 to advance the rotor to the next position. This advancement will occur when the phase 3 windings or the winding 12C is energized. As in the previous step a selected interval after the clock pulse is generated the $\overline{OS2}$ signal will appear and will be effective for energizing all of the windings of the stator and allow the rotor to advance positively to the next position. This action continues so that the counter output pattern will next signal 0 1 in response to the next clock pulse and then on the 3rd clock pulse will return to the setting 00 and cycle in the same fashion for continuously stepping the record member 20.

What is Claimed is:

1. Control apparatus for a stepping motor comprising a plurality of energizable windings for advancing the rotor in response to the sequential energization of the stator windings, and circuit means for sequentially energizing the stator windings for advancing the rotor in response to the energization thereof, said circuit means including further circuit means for momentarily energizing all of the stator windings for a preselected time interval less than the time period required to advance the rotor from position to position and while the rotor is advancing from one position to the next, the preselected time interval being of a duration to electrically damp the rotor upon arrival at said next position.

2. Control apparatus for a stepping motor as defined in claim 1, wherein the circuit means includes counting means for providing output control signals for controlling the sequential energization of the stator windings and signal control means for stepping the counting means from count to count.

3. Control apparatus for a stepping motor as defined in claim 2, wherein said further circuit means comprises time delay means for providing a signal of a said preselected time interval for energizing all of the stator windings.

4. Control apparatus for advancing a record member, said apparatus comprising motor means adapted for advancing a record member coupled thereto, said motor means including a plurality of energizable winding means and a rotor, the energization of an individual winding means causing the advancement of the rotor and a record member coupled thereto, a source of control signals for providing output signals occurring at a rate related to the desired rate of advancement of a record member, counting means coupled to be responsive to the output signals from said source and providing output signals coupled to the energizable winding means for sequentially energizing the individual winding means for actuating the motor rotor in accordance with the count thereof, and winding control means coupled to be responsive to the control signals for providing an output signal to each of the energizable winding means for an interval less than the time required to advance the rotor from position to position and in coincidence with the energization by the counting means of said individual winding means for damping the rotor in its advancement from position to position.

5. Control apparatus for incrementally advancing a record member having control information recorded thereon, and including means for sensing the control information as the record member advances and providing a control signal at each preselected increment of advancement of the record member, the improvement comprising stepping motor means coupled to the record member and adapted for linearly advancing the record member at said preselected increments, the motor means including a stator having individually energizable windings and a rotor magnetically coupled to the stator and responsive to the energization of the individual windings for rotating said preselected increment, binary signal generating means coupled to be responsive to the control signals derived from the record member and providing binary signals in response thereto, binary counting means coupled to be responsive to the binary signals for providing output signals coupled to individual windings of the motor means in accordance with each count thereof for the duration of the count, and anti-jitter control means coupled to be responsive to the binary signals for providing a winding energization signal of a preselecte duration less than the time period required to advance the rotor from position to position and at a preselected interval after the energization of the individual windings by the counting means to all of the winding means, the preselected interval being defined for reducing the oscillation of the rotor at each increment of advancement for positively advancing the record member.

6. Control apparatus for incrementally advancing a record member as defined in claim 5, wherein the binary counting means includes binary decoding means for decoding the pattern of output signals from the binary counting means for energizing the individual windings of the motor means in a predetermined sequence for linearly advancing the record member.

7. Control apparatus for incrementally advancing a record member as defined in claim 6, wherein the record member has a plurality of longitudinally aligned feed holes for generating the control signals corresponding to each of the feed holes, and the motor means includes a sprocket wheel coupled to be rotatable with the motor rotor and engaging a feed hole for advancing the record member with the advancement of the rotor, said binary signal generating means including means for controlling the repetition rate of the binary signals in accordance with the desired rate of advancement of the record member.

8. Control apparatus for incrementally advancing a record member as defined in claim 7, wherein the counting means is a bi-directional counter and includes means for controlling the direction of counting in accordance with the desired direction of travel of the record member.

9. Control apparatus for incrementally advancing a record member as defined in claim 7, wherein the means for controlling the repetition rate of the binary signals includes means for controlling the rate of advancement of the record member for sensing the information on the record member and means for controlling the rate of advancement without sensing the record member.

10. A method of controlling a stepping motor including a rotor and a stator having a plurality of energizable windings spaced around the rotor for incrementally rotating the rotor in accordance with the energization of the stator windings, the method including the steps of sequentially energizing an individual winding of the stepping motor to cause the rotor to magnetically snap into alignment with the energized winding and thereby incrementally rotate the rotor in accordance with the sequential energization of the windings, and during the interval an individual winding is energized and while the rotor is advancing between stator poles momentarily energizing all of the windings of the stator for a time interval less than the time period required to advance the rotor from position to position and of sufficient time duration to prevent the rotor from hunting.

11. A method of controlling a stepping motor including a rotor having a plurality of magnetic poles defined thereon and a stator having a corresponding plurality of energizable windings spaced around the rotor, the windings being divided into spaced groups of different phases for defining stator poles with the adjacent windings of each group arranged for defining poles of opposite polarity and the windings of the same phase in each group being connected together whereby the sequential energization of the stator windings in each group causes the rotor to magnetically align with the energized winding and the stator pole defined thereby to incrementally rotate the rotor, the method including the steps of sequentially energizing an individual winding of each group for incrementally advancing the rotor, a preselected interval after an individual winding of each group is energized and during the time the rotor is advancing between stator poles, energizing the adjacent windings of each group for a preselected interval less than the time period required to advance the rotor from position to position, and maintaining the energization of said individual windings after the preselected interval to cause the rotor to incrementally advance without producing settling in oscillations.

* * * * *